June 1, 1965  H. L. O'NEAL  3,186,770
CONDITION RESPONSIVE CONTROL, METHOD AND APPARATUS
Filed Jan. 3, 1962  3 Sheets-Sheet 1
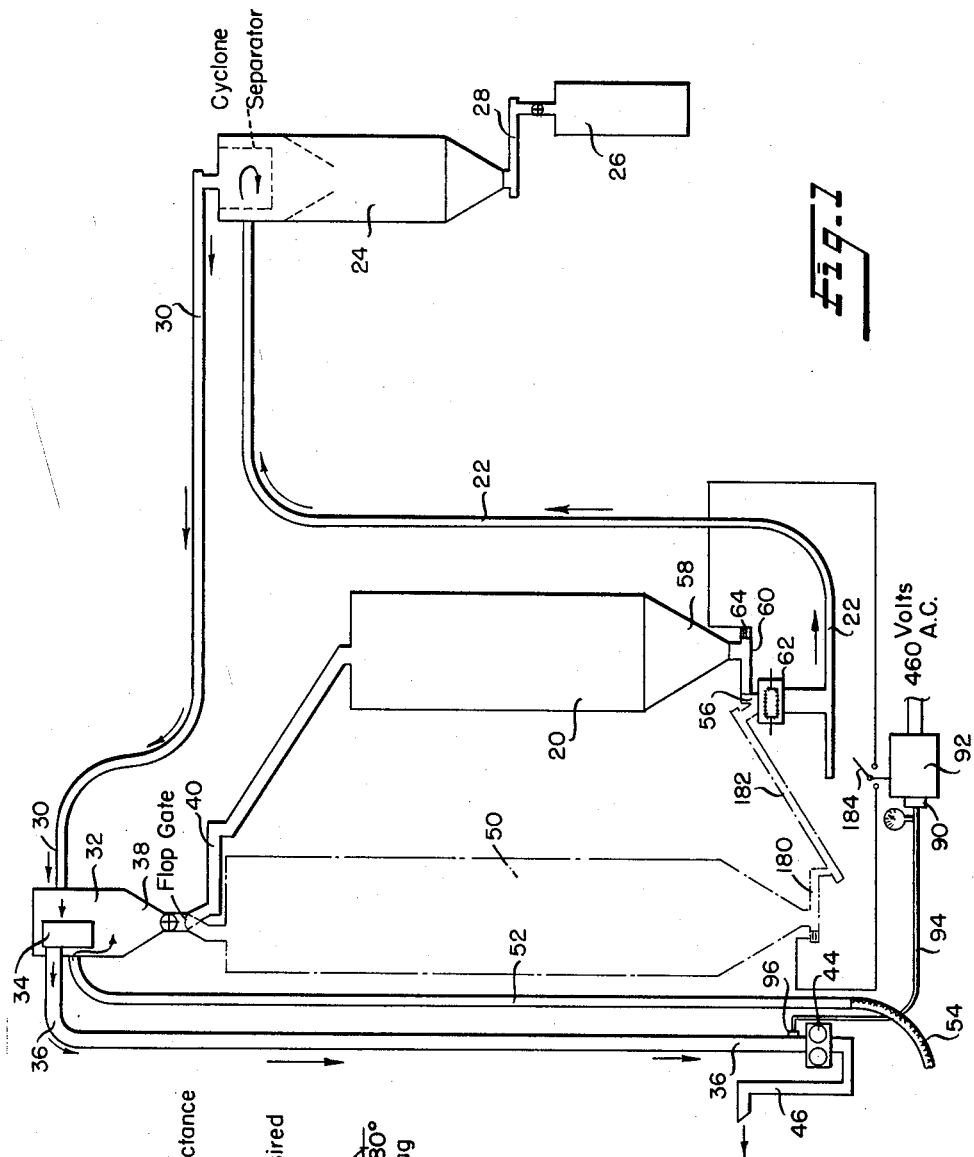
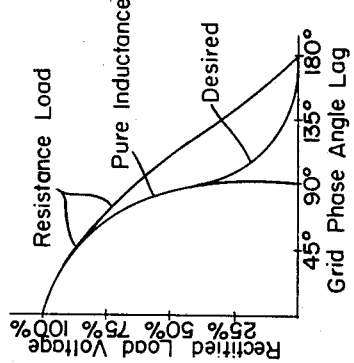
INVENTOR
Harry L. O'Neal
BY *Strauch, Nolan & Neale*
ATTORNEYS

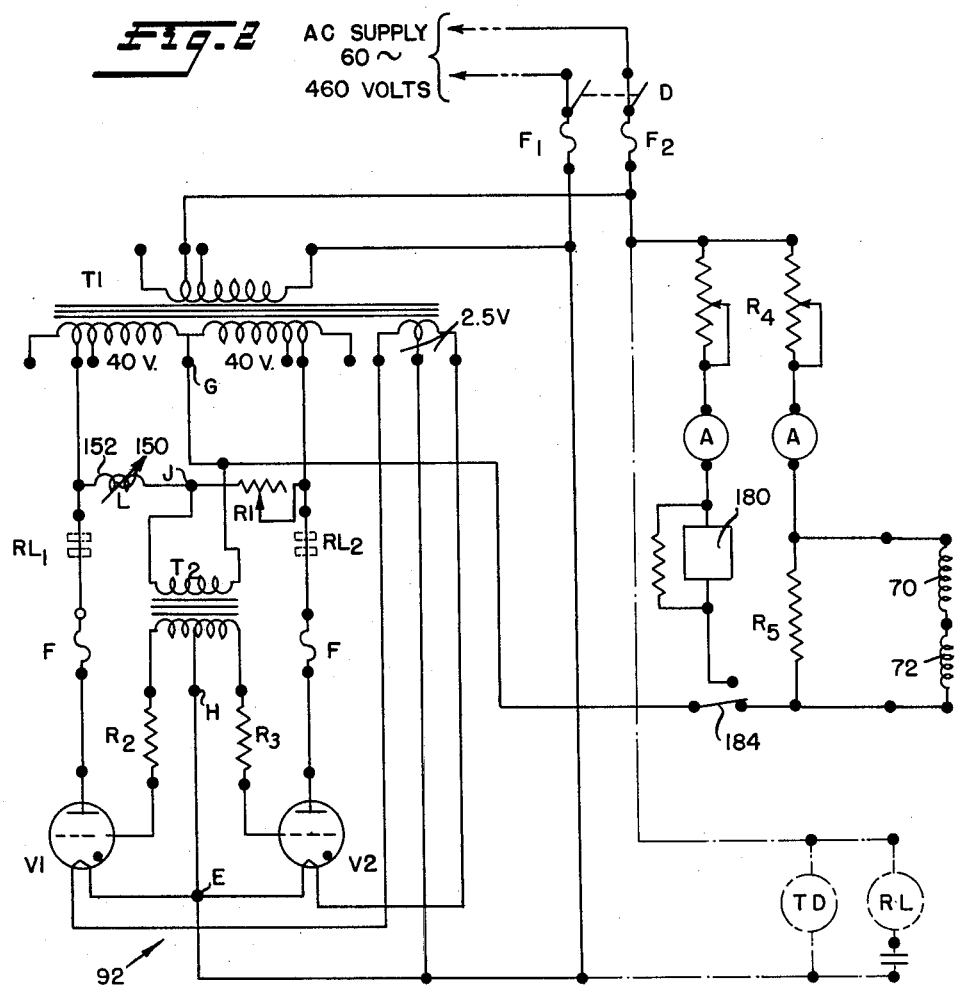
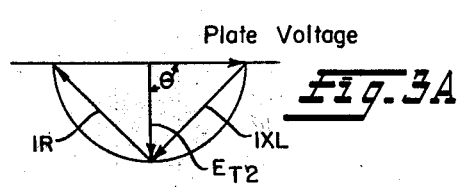
Fig. 3A
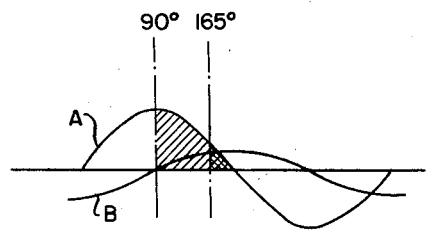
Fig. 3C
INVENTOR
Harry L. O'Neal
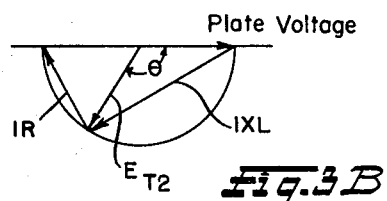
Fig. 3B
BY Strauch, Nolan & Neale
ATTORNEYS June 1, 1965
H. L. O'NEAL
3,186,770
CONDITION RESPONSIVE CONTROL, METHOD AND APPARATUS
Filed Jan. 3, 1962
3 Sheets-Sheet 3
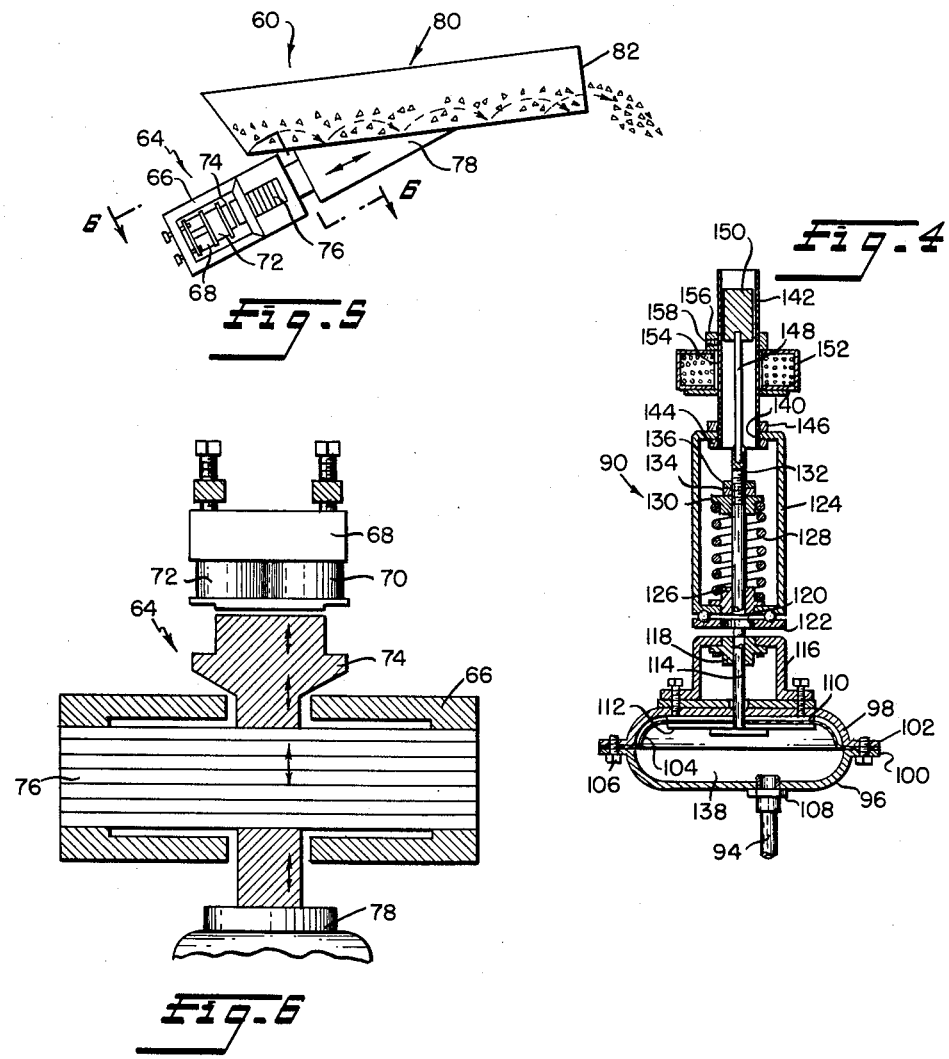
INVENTOR
Harry L. O'Neal
BY *Strauch, Nolan & Neale*
ATTORNEYS United States Patent Office 3,186,770
Patented June 1, 1965

3,186,770
CONDITION RESPONSIVE CONTROL, METHOD AND APPARATUS
Harry Lee O'Neal, Pine Bluff, Ark., assignor to O'Neal & Causey, Pine Bluff, Ark., a partnership
Filed Jan. 3, 1962, Ser. No. 164,101
17 Claims. (Cl. 302—42)

This invention relates to a condition responsive control method and apparatus and more particularly relates to continuously automatic control of a vibrator feed device for introducing material into a pneumatic conveyor system, the control being continuously variable, responsive to a conveyor system pressure condition.

In previously known pneumatic granular material conveying systems, material is gravity fed from a storage bin to an electromagnetic vibratory pan feeder the controls of which are usually manually adjusted to feed the material into an inlet of the pneumatic conveyor at a steady rate. Ideally, if the material in storage would retain the same qualities of feedability at all times, the vibrator could be set to vibrate at a proper amplitude, there would be no need for variations in the rest of the conveying equipment and theoretically the system would work excellently. However, the theoretically ideal situation is unobtainable for various reasons, primarily the different granular material feed characteristics due to changing quantity in the storage bin, material moisture content, temperature and other variables. These changing material characteristics effect the gravity feed rate and also material feed movement in a vibratory feeder and can occur from one moment to the next. Also, many vacuum pneumatic systems use filters to reclaim material and to protect the exhaust blower or pump from the materials being conveyed and such filters gradually clog and increase pressure differentials across the filter. Should the filter be permitted to become too much clogged, the pressure differential increases beyond a permissible maximum where the granular material in the conveying pipe can no longer be carried by the moving air stream and will drop from the stream and plug the conveying pipe completely.

The present invention provides an improved pneumatic conveyor system with an acceptable highly efficient and dependable automatic control of the feed input rate to the pneumatic conveying conduit. In general, the system includes a pneumatic conveyor for transporting material from one location to another location, a pneumatic transducer sensing device, an electronic control and a power circuit for an electromagnetic vibratory pan feeder for introducing the granular salt cake into the pneumatic conveyor. Although this invention was specifically developed to eliminate faults and disadvantages present in a pneumatic system for conveying salt cake (sodium sulfate) from a storage hopper to what is known as a "day tank" for feeding salt cake to a mixing tank in a paper mill, there are also subcombination inventive aspects which can be utilized for the handling or feed introduction of various other types of granular materials to either a pneumatic system, belt conveyor or weighing device. The electronic control apparatus of this invention measures a condition indicative of conveyor system delivery rate, and varies the input feed rate accordingly in a continuous manner. The control apparatus could be utilized to increase efficiency of and eliminate some of the troubles encountered with many types of conveyors. The power circuit for the vibrator coils provides a continuous unidirectional flux pattern, permitting some flux to be present in the coils at all times, permitting a closer control of vibrator movement, reducing hysteresis losses and increasing economy of vibrator operation.

Accordingly, a primary object of this invention resides in providing an improved conveyor system with completely automatic system control apparatus and a novel method of continuously variable, automatic control of the conveyor system.

A further object resides in the provision of an automatic control means, continuously responsive to a condition of a conveyor indicative of the load of material being conveyed, in direct control of the rate of introduction of such material to the conveyor.

Another object resides in the provision of a novel method of and apparatus for simple and automatic regulation of the feed rate of materials handled by a conveyor system to gain improved efficiency from and greater dependability in continuous operation of the conveying equipment over that previously obtained.

A still further object resides in the provision of automatic regulation for introduction of particulate material to the inlet of a pneumatic conveyor at a controlled rate continuously variable in proportion to a condition indicative of the mass of material being carried by the air stream in the conveyor conduit and by such continuously automatic control to prevent flooding, choking and subsequent shut-down of the pneumatic system.

Still another object resides in providing a novel material feed control apparatus, for a pneumatic conveyor which includes a filter unit, in which the control device automatically continuously compensates for changes in differential pressure load in the conveyor due to gradual plugging and then unplugging of the filter unit.

Still another object resides in providing a novel control circuit for an electromagnetic vibrator feed table wherein the control provides a unidirectional variable amplitude of a continuous flux pattern in the coils of the vibrator.

A further object resides in the provision of an electronic control device providing a pulsating continuous D.C. potential to the oscillatory motor of a vibrator feed table particularly characterized in that each pulsating D.C. wave fed to the vibrator is shaped to provide a greater vibrator snap action for less power input. In conjunction with this object, a still further object resides in the provision of a novel transformer and circuit designed to efficiently handle such D.C. pulses and reduce failure of the electronic discharge and circuit component devices.

A still further object resides in the provision of a novel control apparatus for providing an automatically controlled amount of continuous unidirectional electrical power to the load windings of an oscillating electric motor, e.g., an electromagnet with spring loaded armature.

In conjunction with the preceding object, a further object resides in providing in the control apparatus, a novel circuit in which a pair of grid controlled gas tubes are connected in series with the load winding and a grid control circuit for the tubes provides tube operation in response to a varying condition to produce a pulsating unidirectional voltage and/or current waveform in the load circuit to result in a sharply defined snap action in motor oscillation with relatively low power input.

Still another object resides in providing a combination oscillating motor vibrator with an automatic electronic control, the combination having terminals for connection to a source of alternating voltage, a load circuit and an electronic circuit connected in series with the load circuit and across the voltage source terminals, the electronic circuit including a pair of grid controlled gas discharge tubes each having an anode and a cathode, a transformer having a primary winding connected to the voltage source and a secondary winding connected to the tube anodes, a center tap on the transformer secondary winding connected to the load circuit, the secondary providing a magnitude of voltage substantially less than the magnitude of the source voltage connection from one terminal of the voltage source to both cathodes and from the other terminal of the voltage source to the load circuit, so that a higher voltage is applied to one tube than is applied to the other tube, and a circuit with a variable impedance responsive to a control condition for applying a potential to the grids of each tube to cause the tubes to begin conduction at different times during each cycle of the applied voltage.

Further novel features and other objects of this invention will become apparent from the following detailed description, discussion and the appended claims taken in conjunction with the accompanying drawings showing a preferred structure and embodiment in which:

FIGURE 1 is a schematic representation of an exemplary pneumatic system embodiment of the present invention in which the pneumatic tranducer sensing device and electronic control circuit for the power circuit of an electromagnetic pan feeder control introduction of granular material into the inlet of the pneumatic conveyor;

FIGURE 2 is an electrical circuit diagram for the system and includes the variable inductor of the pneumatic transducer, the electronic control circuit and the load circuit with the electromagnetic coils of the vibrator feed table;

FIGURES 3A and 3B are voltage vector diagrams showing the phase control circuit for the grid voltages;

FIGURE 3C is a voltage waveform diagram showing the phase delay of the grid voltage for one tube as compared with its anode voltage;

FIGURE 3D is a chart showing a series of voltage waveforms that may be obtained in a circuit of this type;

FIG. 4 is a vertical section through an exemplary embodiment of the pneumatic transducer utilized in the system illustrated in FIGURE 1;

FIGURE 5 is a diagrammatic side elevation illustrating a representative type of an electromagnetic pan feeder used in the system of FIGURE 1; and FIGURE 6 is a detail plan view taken on line 6—6 of FIGURE 5 showing a conventional vibrator spring bar and oscillating armature construction, the relative size of the gap being slightly greater than the magnitude of maximum oscillation of the vibrator table.

The following detailed description is based on an actual installation of a pneumatic conveyor installed in the pulp mill portion of a paper making plant, the system being utilized to transport salt cake (sodium sulfate), used in the process of converting wood chips to pulp for use in making paper, from a ground level storage hopper 20 through a pneumatic conduit 22 which in the case of the exemplary installation rises approximately 75 feet to the upper story of the pulp mill.

Conduit 22 is connected in fluid communication to an apparatus known as a day tank 24. Although not specifically so illustrated, the day tank 24 is a combination cyclone separator and storage tank from which salt cake passes into a salt cake mix tank 26 by means of an auxiliary conveyor 28. Neither the mix tank 26 nor the auxiliary conveyor 28 constitute aspects of the present invention other than to depict a reason for transporting the salt cake into an elevated position.

The pneumatic conveyor includes a further conduit 30 which exists from the top separator portion of the day tank 24 and progresses to an air filter unit 32 which can consist of a separator for example, a cyclone separator, and an air filter assembly 34 disposed ahead of an outlet conduit 36. Filter unit 32 includes mechanism which periodically shakes the group of air filters 34 to dislodge salt cake material filtered from the conveyor air stream passing from conduit 30 on through conduit 36. The hopper-shaped bottom 38 of filter unit 32 leads to a second auxiliary conveyor 40 carrying filtered and reclaimed salt cake back to the primary salt cake storage hopper 20.

Outlet conduit 36 from filter unit 32, is at least 12 inches in diameter and connects to the inlet of an exhauster pump 44 which is connected to an exhaust conduit 46 leading to atmosphere. Exhauster 44 has sufficient power and capacity to create a pressure differential, between the pneumatic conveyor inlet and its outlet to atmosphere, of a value in excess of 7.5 p.s.i. which, in the case of the pneumatic conveyor being described, represents a maximum differential above which the pneumatic conveyor starts to clog. Actually the inventive system operates most efficiently when the pressure differential in the pneumatic conveyor is maintained between 4.7 p.s.i. and 5.5 p.s.i. at which condition, if maintained, the equipment is capable of moving 12,000 pounds per hour (6 tons per hour) of granular sodium sulfate.

Also illustrated in FIGURE 1 and to be referred to later in this description is a storage tank 50, used as a stand-by storage for the primary storage hopper 20, and an auxiliary inlet conduit 52 which leads from a flexible railroad car connecting conduit 54 into the aforementioned filter unit 32. The auxiliary conduit 52 and flexible conduit 54, which are included herein as part of the complete system enable means by which the pneumatic exhauster 44 can be utilized to convey granular material from the railroad transportation units (covered hopper cars) into one or the other of the storage units 20 or 50. Storage unit 50 will be referred to later in this description.

The pneumatic conveyor which includes conduit 22, the upper portion of day tank 24, conduit 30, filter unit 32, conduit 36, exhauster 44 and exhaust conduit 46 is a closed system from its inlet 56 adjacent the bottom outlet 58 of primary storage hopper 20 to the atmospheric exhaust conduit 46. The granular salt cake material is fed from storage hopper outlet 58 by an electromagnetic vibratory pan feeder 60 through a hammer mill 62 into the pneumatic conveyor inlet 56.

In previously known conventional pneumatic salt cake conveyor systems the granular material is fed by gravity from storage tank 20 to the electromagnetic pan feeder 60. Although the electromagnetic pan feeder 60 has a construction which, per se, is not a part of the present invention, it is a component of the entire system and therefore will be explained, at least in general terms. With respect to FIGURES 5 and 6 it will be seen that pan feeder 60 includes an electrically powered oscillating motor 64 which consists of a main frame 66, a stationary stator 68, two power coils 70 and 72 (also shown in FIGURE 2) connected in series and when energized, providing an additive flux to attract an oscillating armature 74 secured to a spring bar stack 76, the stack 76 being rigidly secured at its opposite ends to the main motor frame 66. The projected end of the motor armature 74, as seen in FIGURE 5, is rigidly secured to a base support member 78 on the bottom of a feed pan 80 which has three side walls, is open at one end 82, and is placed directly under the outlet opening 58 of the storage hopper 20. As will be understood, proximity of the pan 80 to the hopper outlet opening permits gravity feed of material from storage hopper 20 into the feed pan 80 only so long as material is being continuously moved off of the open end 82 of the feed pan.

Electrical impulses through the motor coils 70 and 72 create a series of magnetic pulls of varying strength. Each magnetic pull attracts the armature toward the magnet core and the restoring spring tension built up by flexing of the spring stack bars opposes the magnetic pull. This opposing force causes the vibrator bars 76 to snap away from the magnet with interruption or change of current through the coils 70 and 72. The momentum thereby acquired springs the bars into a slight reverse curve. The armature and stator never come into actual contact, and thus there is no contact noise. Neither is there a visible movement of the deck of feed pan 80. Nevertheless the vibrations do cause the material in the pan 80 to flow forward toward the open end 82 whether the pan 80 is inclined up or down. To all appearances, the material moves over the deck like a smooth flowing stream, the material particles being projected from the deck in a continuous series of rapid forward hops, greatly exaggerated in FIGURE 5, which are similar to saw teeth in outline. Since the hopping action keeps the material in suspension, there is no sliding contact with the deck surface. Abrasive wear therefore is negligible and the vibratory conveyor pan can handle large tonnages of granular material before wearing out.

With reference again to FIGURE 1, as has been described, the vibrator feed pan 80 takes material from storage hopper 20 and feeds it into the inlet of the pneumatic conveyor conduit 22. The hammer mill 62 is used to crush the large granular particles of salt cake into finer particles which are more easily conveyed by an air stream. If the salt were purchased in fine particle form, hammer mill 62 could be omitted. Because the exhauster 44 is drawing air through the conveying conduits in the direction of the arrows, the moving air will hold the finely ground granular material in suspension and transport a certain weight of that material in proportion to the quantity of air flow through the conduit. As the material and air pass through conduit 22 into the day tank 24, most of the material will separate from the air within tank 24 and drop into the hopper shaped bottom of tank 24 from whence it will be taken as needed by further processing units such as the mix tank 26. Some of the entrained material passes with the air on out of the top end of day tank 24, through the conduit 30 and into the filter unit 32 wherein the filter assembly 34 removes substantially of the remaining entrained material. The filtered air then passes through conduit 36, through exhauster 44 and thence to atmosphere.

The basic principle of a pneumatic system is that at a given weight and density, air can hold in suspension and transport only a given weight of other materials. As this ratio of air to the conveyed medium becomes excessively air, the unit decreases in efficiency by failing to transport materials at a desirable rate. If the ratio becomes excessively material, air flow cannot be maintained, the pressure differential will increase exceedingly and the conveyed material will drop out of suspension and be deposited in the conduit and will plug the pneumatic system.

Thus, if it were possible for the material passing from the storage hopper 20 through the pneumatic conveyor to retain the same quality of feedability at all times, the vibrator could be set to vibrate at an amplitude which would provide the proper rate of feed of material at all times and, assuming no variation in the remaining components of the system, the system should work continuously in an excellent manner. However, as has been previously stated, there are many reasons why such an ideal situation is not obtainable, and the vibrator feed table must be utilized to compensate for changes in material conditions if ideal operation of the pneumatic conveyor is to be sustained for any length of time. For example, the filter 34 will gradually clog and increase the pressure differential across it. This increase in pressure differential due to filter loading is intended to be overcome by periodic shaking of the filter, but if vibratory feed continues at a fixed rate, the conduit can clog before the filter is cleared. There are other factors which result in the air-material ratio to become excessively material in which case a point is reached where the conveyed material will drop from the air stream and deposit as a plug somewhere in the conduits instead of being transported. This condition can thoroughly plug the pneumatic conveyor and was experienced consistently in the aforedescribed system before it was modified in accord with the present invention. Control of the bare conveyor system just described has previously been through a manual rheostat to pre-set the desired vibratory amplitude of the feed table. Such an arrangement attempted to keep a constant amplitude of vibration and would have been satisfactory if the material would feed at a constant rate, however excessively free flowing material would feed at a greater rate than desired and overloads the suction piping with resultant depositing of material in the conveying pipe. On the other hand, if the material resisted free flowing the pan feeder's delivery to the suction conduit will decrease, causing the system to be inefficient by not moving enough material in a given length of time.

To applicant's knowledge, many paper mills have similar systems which are constantly plagued with plugging of the pneumatic conveyor conduits. At least one such system has been modified to include an arrangement of pipe taps throughout the length of the conduit so that if a plug of material does develop, an appropriate valve (pipe tap) can be opened near the head end of the material plug, admitting air to that point and allowing the material between the valve and the vacuum pump to be removed. This first valve is then closed and the next valve from the head of the plug is opened removing the next portion of the plug and so on until the plug is cleared from the conduit.

Another installation, to applicant's knowledge, has had so much trouble with the aforedescribed pneumatic system for feeding a temporary storage (day tank 24) that the entire pneumatic conveyor system was discarded and a belt conveyor system substituted in its place. To applicant's knowledge, all paper mills in the mid-south area of the United States equipped with pneumatic conveyors substantially in accord with the foregoing description have troubles with their systems clogging, but even so believe that the pneumatic conveyor is still the best means developed for handling salt cake in the paper mills.

The desired result in applicant's system is to provide a controlled system which includes simple automatic continuous variable regulation of the rate at which the granular material is fed into the pneumatic system and to thereby maintain the system in operation over extended periods of time and gain maximum efficiency from the conveying equipment. The system feed inlet rate is controlled to reduce vibratory feeding when the pneumatic conveyor starts to load up and to increase vibratory feeding when the pneumatic conveyor is underloaded. Because the pressure differential between the pneumatic conveyor inlet 56 and the inlet side of the exhauster 44 will increase with an increase in feed material load in conduits 22 and 30 or in filter unit 32, the magnitude of differential pressure between conduit 36 and atmosphere provides a direct indication of the conveyor load. Thus, if suction in conduit 36 becomes greater than a desired normal value, the pneumatic conveyor is becoming loaded and the feed rate should be reduced to prevent complete clogging and permit the conveyor to clear itself. Conversely if suction in conduit 36 drops below a desired normal value, feed rate should be increased to maintain an efficient conveyor load.

The system control apparatus controls the vibrator table feed rate and includes a pneumatic transducer, details of which are shown in FIGURE 4. Transducer 90 can be seen in FIGURE 1, represented by the small block situated to the left hand side of the large block 92 representing the electronic control device, and is connected by a vacuum line 94 to a tap 96 in conduit 36 adjacent the inlet of exhaust 44. In response to suction pressure changes in conduit 36, the pneumatic transducer 90 senses the change in differential pressure in the pneumatic conveyor, which change is directly proportional to the weight ratio of conveyed material to air flow. As will be described hereinafter, the transducer 90 varies the inductance of a variable impedance grid control network in electronic control device 92 which results in desired control changes of the incremental time and amplitude of vibrations of the feed table which in turn varies the rate of feed of particulate material (salt cake) into the pneumatic conveyor inlet. This control of feed material to the pneumatic conveyor inlet in response to differential pressure changes will maintain the average load on the exhauster pump constant by automatically compensating for any variation in feed material feed characteristics which effects the feed rate and depth of vacuum in the pneumatic conveying system.

In FIGURE 4, transducer 90 consists of a two-part diaphragm housing 96 and 98, each part having peripheral flanges 100 and 102 which are secured together and clamp the peripheral edge of a flexible diaphragm 104 by means of screws 106. The lower half of housing 96 includes a vacuum connection 108 to which is connected the aforedescribed vacuum line 94 (FIGURE 1). The central portion of diaphragm 104 is clamped by discs 110 and 112, to which is secured an operating stem 114 projected vertically through an aperture in the upper housing part 98. Discs 110 and 112 and stem 114 may be rigidly secured to the diaphragm 104 in any well-known sealed manner. Stem 114 projects up through a bracket 116 and a bushing 118, through an enlarged aperture 120 in a universal joint plate 122 which constitutes the support race for upper and lower pairs of diametral balls providing two axes of the universal joint displaced 90° from one another. Stem 114 projects on up through a second bushing 126 in the lower wall of an induction coil support 124 extending through a coil compression spring 128, through a spring retaining washer 130 and terminating in a threaded end 132. An adjusting nut 134 and lock nut 136 are threaded on the stem threaded end 132 and are used to adjust the compression bias of spring 128. The bias of compression spring 128 maintains the diaphragm 104 in its inactive or upwardly deflected position as is illustrated in FIGURE 4. An increasing suction condition through vacuum line 94 into the lower chamber 138 of the diaphragm housing will exert a force through the diaphragm 104 to draw the stem 114 downwardly against the bias of spring 128.

The upper bridge of the induction coil support cage 124 includes a large aperture 140 which receives the lower end of an adjusting sleeve 142 made of a nonmagnetic material, the lower end of sleeve 142 being threaded and rigidly fastened in the upper bridge of the coil support cage 124 by two nuts 144 and 146. Inserted into a counterbore in the upper end of stem 114 and coaxially maintained, as by a press fit, is a small rod 148, preferably slightly flexible, also made of non-magnetic material, and carrying on its upper end a soft iron plunger 150. Plunger 150 may be maintained coaxially within the non-magnetic sleeve 142 by loose axial journalling of operating stem 114 in the two bushings 118 and 126. In dirty atmosphere, the bushings may be omitted if stem friction effects response. In any event, reciprocating shifting movement of stem 114, because of the differential between atmospheric and low suction pressure in diaphragm chamber 138 and the opposing spring force of the adjusting spring 128, will result in variations in vertical positioning of the soft iron plunger 150, the universal mounting of the transducer assembly and slight flexibility of rod 148 helps eliminate undesired forces.

Disposed around the non-magnetic sleeve 142 is an induction coil 152 carried by an adjustable sleeve 154, the upper end of which carries a clamping collar 156. By means of a set screw 158 in the sleeve collar 156, the induction coil 152 may be vertically positioned on the non-magnetic sleeve 142 in order to vary the relative effect between the soft iron core 150 and the induction coil 152.

Turning now to FIGURE 2 a specific description of the electronic control device 92, including the variable inductance L (150, 152) and the power control circuit with the motor coils 70 and 72 will now be provided. The circuit is illustrated for providing a controlled amount of electrical power to the vibrator coils 70 and 72 which here comprise the load circuit for a pair of grid controlled gas tubes V1 and V2 which, for example, may be 3C23 thyratrons. These tubes are connected in series with the load circuit to be across the input alternating power line terminals at on-off switch D. The pulsating unidirectional current flow is from main power fuse F1 to the common cathode connection at E, through a conducting tube and half of the secondary of control transformer T1 to the secondary center tap G, through the load circuit, which includes a shunt load resistor R5, and through ammeter A and an adjustable line rheostat R4 to main power fuse F2.

In the circuit illustrated, the operating voltage at switch D is 460 volts at 60 cycles. The primary winding of control transformer T1 is connected across the incoming line and the secondary winding is such as to provide 40 volts on each side of the center tap G. Thus the anode voltage on one tube, V1 (for example), is higher than the line voltage by about 40 volts while the anode voltage on the other tube V2 is lower than the line voltage by the same amount. In the illustrated circuit, one of the tubes carries approximately 40% and the other tube carries approximately 60% of the total load current.

The control of the actual firing time of the respective tubes V1 and V2 is determined by the phase and amplitude of the voltage applied to the grids of tubes V1 and V2. In the illustrated embodiment, the amplitude of the grid voltage between the center tap H of the secondary of grid circuit transformer T2 (which is connected to the common cathode connection E) and the end terminals of T2 secondary varies from about 18 to 24 volts. Resistors R2 and R3 are grid leak resistors and may have resistance values on the order of one megohm.

The primary winding of the grid circuit transformer T2 has one terminal connected to center tap G of control transformer T1 which serves as a reference point and the other terminal is connected to a junction J between the variable inductance L and a variable resistor R1. The variable inductance L, as has been described, is the core 150 and coil 152 of the mechanical-to-electrical transducer 92 which senses the pressure in the pneumatic conveyor conduit 36. Resistor R1 is manually adjustable to enable manual adjustment of the desired operating point, and in this embodiment has a range of between 800 and 1500 ohms. The inductive reactance XL is such that the voltage across the primary winding of grid transformer T2 varies in amplitude from about 0.3 to 0.4 volt.

A diagram of the phase variation of the control voltage applied to grid transformer T2 is shown in FIGURE 3. Since the resistance varies between 800 and 1500 ohms and the inductive reactance also varies over a comparable range, the phase of the transformer T2 primary voltage may be made to lag the anode voltage of tubes V1 and V2 by an angle $\theta$. The angle $\theta$ is arranged to be about 90° as shown in FIGURE 3A. Where less power is required, this may be achieved by increasing the inductance reactance to increase phase lag $\theta$ to 135° or more as shown in FIGURE 3B. The voltage $E_{T2}$, having such a phase displacement is applied to the grid of one of tubes, V1 (for example), and a voltage having a phase displaced by 180° is applied to the grid of the other tube by secondary of grid transformer T2. The firing or ignition time of the two tubes thus occurs at substantially different times during the 360° cycle of a sine wave. And as the anode voltage for one tube may be about 500 volts while the anode voltage for the other tube is about 420 volts, voltage and current wave patterns are produced that have a substantial power impulse during the second half of the conducting portion of the applied voltage wave which gives a greater snap action of the vibrator armature for less power input.

By reducing the anode voltage for the tube that fires first, an initial current in the vibrator coils 70 and 72 may be a sufficient value to provide only the minimum vibratory feed which would be desired, during operation of the system. Then when the second tube fires, the anode voltage is near or slightly beyond its maximum value to produce a supplemental power pulse at selected phase positions during the last half of the positive going half of the sine wave as determined by the sensing element. By this arrangement, the tube with the higher applied voltage may be made to conduct the shorter length of time which is less than one quarter of the period of the sine wave. This enables utilization of the phase of the control voltage applied to this tube, which carries the higher peak current, to vary the magnitude of displacement of the feed pan by controlling the maximum flux in the vibrator coils at the precise instant of cut-off of current conduction through the tubes.

One important aspect of this invention thus resides in the circuit arrangement for controlling the operation of the tubes V1 and V2 to produce a voltage and/or current waveform which gives a greater snap action for less power input. Resistor R5 which is in shunt with the vibrator coils may have a value in the order of 50 ohms to improve the waveform and reduce any inductive kick back on the tubes when the current conduction is cut off. Rheostat R4 serves to limit heavy peak currents and aids in keeping a gas type tube, such as thyratron, conducting to the end of the 180° point at a low amplitude when the control grid potential has already gone negative.

In FIGURE 3C the circuit or anode voltage is shown as curve A. The grid voltage to tube V1 is shown as curve B where it lags the anode voltage by 90°. Tube V1 would thus fire at about the 90° point. As its grid voltage is delayed yet more, its firing point will be delayed yet further in the cycle. The grid voltage applied to the other tube V2 from the secondary of grid transformer T2 is 180° out of phase with curve B and is thus positive when the anode voltage first starts on its positive half cycle. This tube is thus fired for the entire half cycle.

While the circuit has been described with tube V1 having the greater anode voltage and the lagging grid voltage, it is also possible by reversing connections of tubes V1 and V2 to either or both of transformer T1 or T2 secondary windings to change the operation of one or both of the tubes. In FIGURE 3D, the curves show a desired voltage waveform and those obtained with pure inductance loads and with a resistance load. The circuit described gives more nearly the desired waveform.

The aforedescribed circuit plus the spring actuated return of the vibrator armature produces a unidirectional current through the windings which is never permitted to reverse or even reach a zero value. Such a controlled condition reduces hysteresis losses, making the operation cooler and more economical.

In FIGURE 2, a conventional time delay device TD and safety relay RL with relay contacts RL1 and RL2 are shown in phantom lines. As will be understood by those skilled in the art such a circuit enables a short warm-up period for the tube heaters and in the case of the present invention will also permit a sufficient time delay of vibrator feed action to permit the pneumatic conveyor to reach an equalized operating condition and purge the conduits before material to be conveyed is fed to the conveyor.

Returning now to FIGURE 1, it will be seen that the secondary storage tank 50 has a hopper bottom outlet which gravity feeds material into a second electromagnetic vibratory pan feeder 180 which in turn feeds material into a conveyor 182 with its outlet going into the hammer mill 62 to the main pneumatic conveyor conduit 22. By a simple selector switch 184 the power output of the electronic control unit 92 can be directed to control either the first pan feeder 60 or the second pan feeder 180. In both cases control is responsive to the pressure condition measured by the transducer 90. Note that this secondary conveyor 182 from tank 50 to the hammer mill 62 is not necessarily a pneumatic conveyor in which case there would be a time lag between the change in conveyor differential pressure detected at point 96 and the decrease of feed from the conveyor 182 into hammer mill 62 which would considerably decrease the efficiency of the overall system. However conveyor 182 can be a pneumatic conduit connectible in series with conduit 22 in which case a flop gate valve could be added above the hammer mill 60 to seal off the inlet path from vibratory feeder 60.

It is also noted that the transducer 90 illustrated in FIGURE 4 is exemplary, it being realized that movement of the soft iron plunger 150 can be mechanically amplified through a link and lever system connected between the diaphragm 104 and iron plunger 150.

In the aforedescribed system, filter unit 32 prevents wasting of entrained material, permits reclaiming and prevents damage to the exhauster pump. The filter gradually clogs, as has been previously noted, causing the pressure differential to rise toward a maximum value. The transducer continuously senses such change and by means of control 92 compensates by reducing the vibrator feed rate until the filter shaker cleans the filter. This gradual change in pressure due to filter clogging and filter cleaning occurs approximately every one and a quarter to two minutes. As the filter is cleared, the pressure conditions again change, the transducer again senses this change and causes the vibrator to increase its feed rates sending more material into the system.

In utilizing the control system one must first, experimentally determine the maximum conveyor load capable of being handled continuously by the exhauster pump and the system without clogging. Once the maximum load is determined, vibrator feed rate may be set to load the conveyor to a condition slightly below maximum load by the adjustable resistor R1 in the impedance network of control device 92. Device 92 will thereafter automatically maintain this set load condition. Increase of suction in the pneumatic conveyor beyond the maximum efficiency point will decrease the incremental time periods and amplitudes of the vibrator to decrease vibratory feed of material into the conveyor and any decrease of suction below the maximum efficiency point increases the feed of material by the vibrator table into the pneumatic conveyor. Accordingly, the system provides infinitely variable self-adjusting control of the power input to the vibrator feed table of the pneumatic conveying system to control the material feed rate which in turn effects the suction pressure in the conveyor. By integrating the suction and the feed rate, one can obtain the total weight of materials transported and it will be accomplished in an efficient manner relative to quantity of material transported and power consumed.

Applicant has completely disclosed a system of continuous measuring of the load condition of a conveyor and in response to instantaneous variations of the load condition is continually compensating for an error on either side of an exact desired value of load and insures uniformity of load of material conveyed by balancing the plus and minus errors to continuously accomplish minute increments of accuracy. The aforedescribed system provides a gain in efficiency over any known control system for a pneumatic conveyor and provides a continuous closely controlled operation for effectively unlimited periods and has effectively eliminated shut-down due to clogged pneumatic conduits. The aforedescribed system eliminates 12 to 36 man hours per 24-hour day, which in the past was necessitated just to unplug the condiuts of a normal system without applicant's automatic control. The system further provides a means to controllably vary the rate of filling the described day tank whereby once a desired rate is set, it can be maintained at accurate constant value to control the feed rate at a rate of use of material.

Although the aforedescribed system is specifically utilized in conjunction with a pneumatic conveyor, the electronic control circuit together with the oscillatory motor load circuit, utilized in conjunction with an appropriate condition responsive device indicative of a conveyor load could be utilized to control feed rate of many materials to various types of conveyors. The control circuit provides an effective chopping of the first portion of the D.C. sine wave pulses of current fed to the load coils of the oscillating electric motor to provide the motor with a strong unidirectional snap action for less power input. The transformer and the circuitry have been specially designed to withstand such instantaneously large current pulses and to reduce tube and circuit component failure.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A conveyor system for particulate material comprising:
   (a) a particulate material storage device;
   (b) a conveyor disposed to receive material from said storage device and transport such material to a desired location;
   (c) a particulate material variable delivery feed means disposed between said storage device and said conveyor adapted to controllably receive material from said storage device and deliver it to said conveyor and including:
      (1) an oscillatory electric motor drive means; and
   (d) automatic control means having:
      (1) a power circuit connected to said oscillatory electric motor drive means,
      (2) a signal control means responsive to a conveyor operation condition indicative of the load of material in transport by said conveyor, and
      (3) means continuously responsive to load condition indicative signals in said signal control means and operative on said power circuit for varying the incremental time period and amplitude of power pulses to said oscillatory electric motor drive means to thereby vary the rate of material delivery by said feed means.

2. A conveyor system as defined in claim 1, wherein:
   (a) said conveyor is a pneumatic conveyor with material transporting conduit means and power means to create air flow in said conduits, and
   (b) said signal control means is a combination pneumatic-electrical device with an expansible chamber motor means connected to said conveyor conduit at a location where the pressure in said conduit is indicative of the load of particulate material in said air stream.

3. A conveyor system as defined in claim 2, wherein:
   (a) said storage device is a hopper with a bottom outlet;
   (b) said pneumatic conveyor is a suction type conveyor with an inlet of said conduit means located adjacent said bottom outlet of said storage device;
   (c) said feed means includes a vibratory feed pan located immediately below and closely adjacent said hopper bottom outlet to control the gravity feed of material from said hopper by quantity of material on said feed pan;
   (d) said conveyor power means is an exhauster located adjacent the outlet end of said conduit means;
   (e) said conduit means includes means to remove particulate material disposed between said inlet and said exhauster; and
   (f) said connection to said expansible chamber motor means is made in said conduit means between said exhauster and said means to remove particulate material.

4. A conveyor system as defined in claim 1, wherein:
   (a) said control means includes:
      (1) terminals connected to a source of operative voltage,
      (2) a load circuit including operating coils in said oscillatory electric motor drive means,
      (3) a pair of grid controlled gas discharge tubes, each having an anode, a control grid and a cathode,
      (4) means connecting said cathodes to a common point,
      (5) means connecting said anodes to a common point,
      (6) means for connecting said common points in series with the load circuit between said terminals,
      (7) means adding a voltage less than the source voltage to the anode-cathode voltage of one tube and for subtracting a similar voltage from the anode-cathode voltage of the other tube, and
      (8) means including a variable impedance network circuit applying a potential to said control grids of each tube to cause said tubes to begin to conduct at different times at least 90° apart during each cycle of the applied voltage; and
   (b) said signal control means includes a variable portion of said impedance network circuit.

5. A conveyor system as defined in claim 1, wherein:
   (a) said control means includes:
      (1) voltage source terminals connected to a source of operating voltage,
      (2) a load circuit including operating coils in said oscillatory electric motor drive means,
      (3) a pair of controllable unidirectional current conducting devices, each having a pair of current carrying terminals and a control terminal and being of the type which transfers from a non-conducting to conducting condition by application of a control voltage between the control terminal and one of said current carrying terminals and which when conducting, remains conducting until operating voltage applied across the current carrying terminals is reduced below a predetermined value,
      (4) means connecting both of said one current carrying terminals to a common point,
      (5) means connecting both of the other of said current carrying terminals to a common point,
      (6) means for connecting said common points in series with the load circuit between said voltage source terminals,
      (7) means adding a voltage less than the source voltage to the operating voltage applied to one of said current conducting devices and for subtracting a similar voltage from the operating voltage applied to the other of said current conducting devices, and
      (8) means including a variable impedance network circuit applying a potential to said control terminal of each device to cause said devices to begin to conduct at different times at least 90° apart during each cycle of the applied operating voltage; and
   (b) said signal control means includes a variable portion of said impedance network circuit.

6. A conveyor system as defined in claim 5 wherein:
   (a) said impedance network circuit is an L-R circuit, and
   (b) said signal control means is a transducer including a variable inductance portion of said L-R circuit and a motor connected to vary said inductance in instantaneous response to changes in the material load transported by said conveyor.

7. A conveyor system as defined in claim 6 wherein:
   (a) said conveyor is a pneumatic conveyor with conduit means and air flow producing power means; and
(b) the motor of said signal control means is a spring biased pneumatic, expansible chamber motor, connected to be continuously subjected to the pressure condition in said conduit means and shiftable against spring bias force to positions indicative of said pressure conditions.

8. A conveyor system as defined in claim 6 wherein:
(a) said L-R impedance network circuit includes an adjustable resistor to provide adjustment of the network control value.

9. In combination:
(a) terminals connected to a source of operative voltage;
(b) a load circuit;
(c) a pair of grid controlled gas discharge tubes, each having an anode, a control grid and a cathode;
(d) means connecting said cathodes to a common point;
(e) means connecting said anodes to a common point;
(f) means for connecting said common points in series with the load circuit between said terminals;
(g) means adding a voltage less than the source voltage to the anode-cathode voltage of one tube and for subtracting a similar voltage from the anode-cathode voltage of the other tube; and
(h) means applying a potential to said control grids of each tube to cause said tubes to begin to conduct at different times at least 90° apart during each cycle of the applied voltage.

10. In combination:
(a) voltage source terminals connected to a source of operative voltage;
(b) a load circuit;
(c) a pair of controllable unidirectional current conducting devices, each having a pair of current carrying terminals and a control terminal and being of the type which transfers from a non-conducting to conducting condition by application of a control voltage between the control terminal and one of said current carrying terminals and which when conducting, remains conducting until operating voltage applied across the current carrying terminals is reduced below a predetermined value,
(d) means connecting both of said one current carrying terminals to a common point,
(e) means connecting both of the other of said current carrying terminals to a common point,
(f) means for connecting said common points in series with the load circuit between said voltage source terminals,
(g) means adding a voltage less than the source voltage to the operating voltage applied to one of said current conducting devices and for subtracting a similar voltage from the operating voltage applied to the other of said current conducting devices, and
(h) means applying a potential to said control terminal of each device to cause said devices to begin to conduct at different times at least 90° apart during each cycle of the applied operating voltage.

11. The combination defined in claim 10, wherein:
(a) said means applying a potential to said control grids includes a variable impedance L-R network circuit with an automatically variable inductance.

12. The combination defined in claim 11, wherein:
(a) said L-R impedance network circuit also includes a variable resistance.

13. In combination:
(a) terminals connected to a source of alternating voltage;
(b) a load circuit including highly inductive coils;
(c) means connected in series with the load circuit across said voltage source terminals comprising:
 (1) a pair of grid controlled gas discharge tubes each having an anode and a cathode;
 (2) means including a transformer having a primary winding connected to said source and a secondary winding connected to said anodes;
 (3) a center tap on said secondary winding connected to said load circuit and the magnitude of the voltage in said secondary winding being substantially less than the magnitude of the source voltage:
 (4) means connecting one terminal of the voltage source to both of said cathodes and an opposite terminal of the voltage source to said load circuit whereby a higher voltage is applied to one of said tubes than is applied to the other of said tubes; and
 (5) means applying a potential to the grid of each said tube to cause said tubes to begin conduction at different times during each cycle of the applied voltage.

14. The combination circuit defined in claim 13, wherein:
(a) said load circuit includes a series connected variable rheostat and a shunt connected resistor across said highly inductive coils whereby said load circuit constitutes an adjustable combined load circuit impedance and aids in obtaining desired unidirectional pulses in said load circuit.

15. An automatically controlled vibrator feed table device comprising in combination:
(a) an oscillatory electric motor driven vibrator feed table;
(b) an automatic electronic control apparatus for controlling the amplitude and incremental time periods of motor oscillations, comprising:
 (1) terminals connected to a source of operative voltage;
 (2) a load circuit including highly inductive operating coils in said oscillatory electric motor;
 (3) a pair of grid controlled gas discharge tubes, each having an anode, a control grid and a cathode;
 (4) means connecting said cathodes to a common point;
 (5) means connecting said anodes to a common point;
 (6) means for connecting said common points in series with said load circuit between said terminals;
 (7) means adding a voltage less than the source voltage to the anode-cathode voltage of one tube and for subtracting a similar voltage from the anode-cathode voltage of the other tube; and
 (8) means including a variable impedance network circuit applying a potential to said control grids of each tube to cause said tubes to begin to conduct at different times at least 90° apart during each cycle of the applied voltage.

16. An automatically controlled vibrator feed table as defined in claim 15, including:
(a) a transducer means operable in response to a condition indicative of desired feed rate including a variable inductance portion of said impendance network circuit.

17. A pneumatic conveyor system for particulate material comprising:
(a) a particulate material hopper type storage device with a bottom outlet;
(b) a suction type pneumatic conveyor with material transporting conduit means having at least one inlet and an outlet and power means to create air comprising an exhauster located adjacent the outlet of said conduit means to create air flow in said conduit means, disposed with said inlet of said conduit means located adjacent said bottom outlet of said storage device to receive material from said storage device and transport such material to a desired location, said conduit means including means to remove particulate material disposed between said inlet and said exhauster, said last named means including at least:
  (1) a second storage device in combination with a material-air separator device,
  (2) a filter means with a periodically operative shaker disposed between said second storage device and said exhauster, and
  (3) means to convey reclaimed particulate material from said filter means to said first mentioned storage device;
(c) a particulate material variable delivery feed means comprising a vibratory feed pan located immediately below and closely adjacent said hopper bottom outlet to control the gravity feed of material from said hopper by means of quantity of material on said feed pan and adapted to controllably receive material from said storage device and deliver it to said conveyor and including:
  (1) an oscillatory electric motor drive means; and
(d) automatic control means having:
  (1) a power circuit connected to said oscillatory electric motor drive means,
  (2) a signal control means, responsive to a conveyor operation condition indicative of the load of material in transport by said conveyor, constituting a combination pneumatic-electrical device with an expansible chamber motor means connected to said conveyor conduit between said exhauster and said means to remove particulate material where the pressure in said conduit is indicative of the load of particulate material in said air stream, and
  (3) means continuously responsive to load condition indicative signals in said signal control means and operative on said power circuit for varying the incremental time period and amplitude of power pulses to said oscillatory electric motor drive means to thereby vary the rate of material delivery by said feed means.

References Cited by the Examiner
UNITED STATES PATENTS

| | | | |
|---|---|---|---|
| 1,565,893 | 12/25 | Bergman | 303—22 |
| 2,287,223 | 6/42 | Baird | 318—130 |
| 2,287,880 | 6/42 | Hitson | 318—130 |
| 2,762,658 | 9/56 | Shirk | 302—53 |
| 2,781,234 | 2/57 | Boisture | 302—66 |
| 2,816,803 | 12/57 | Clark | 302—53 |
| 2,819,121 | 1/58 | Bourguet | 302—53 |
| 2,821,439 | 1/58 | Spies | 302—53 |
| 2,898,158 | 8/59 | Pollock | 302—53 |
| 2,905,538 | 9/59 | McIntire | 302—53 |
| 2,921,270 | 1/60 | Cosby | 336—30 |
| 2,922,971 | 1/60 | Jeglum | 336—30 |
| 2,947,578 | 8/60 | Corneil | 302—66 |
| 3,077,365 | 2/63 | Fischer | 302—38 |

OTHER REFERENCES

Chute, George M.: Electronics in Industry, second edition, page 135, Figs. 13–9 and page 326. Figs. 24–8; McGraw-Hill, New York, 1956 (Gr. 210) Gray and Wallon, Principles and Practice of Electrical Engineering, Sixth edition, page 371, Fig. 312; McGraw-Hill, New York, 1947.

SAMUEL F. COLEMAN, Primary Examiner.
ANDRESS H. NIELSEN, Examiner.